Nov. 22, 1966  J. D. BANATHY  3,286,924
TIMER ADJUSTED OVEN THERMOSTAT
Filed Oct. 28, 1963  8 Sheets-Sheet 1

INVENTOR.
JENO D. BANATHY
BY
Robert R. Lockwood
Atty.

Nov. 22, 1966  J. D. BANATHY  3,286,924
TIMER ADJUSTED OVEN THERMOSTAT
Filed Oct. 28, 1963  8 Sheets-Sheet 3

Nov. 22, 1966  J. D. BANATHY  3,286,924
TIMER ADJUSTED OVEN THERMOSTAT
Filed Oct. 28, 1963  8 Sheets-Sheet 7

United States Patent Office 3,286,924
Patented Nov. 22, 1966

3,286,924
TIMER ADJUSTED OVEN THERMOSTAT
Jeno D. Banathy, Chicago, Ill., assignor to International Register Company, Chicago, Ill., a corporation of Illinois
Filed Oct. 28, 1963, Ser. No. 319,286
14 Claims. (Cl. 236—46)

This invention relates, generally, to electric circuit makers and breakers and it has particular relation to such devices employed for setting a thermostat that is used for controlling heat, either gas or electric, that is supplied to an oven, such as a domestic baking oven, to maintain the temperature thereof at certain values depending upon the desired conditions. It constitutes an improvement over the invention disclosed in application Serial No. 243,036, filed December 7, 1962, by Alfred W. Gardes and Edward T. Patrick and assigned to the assignee of this application now Patent No. 3,244,841, issued April 5, 1966.

In the application above referred to the semiautomatic control system is provided for a thermostat. For its operation the thermostat is manually preset to the desired operating or baking temperature, such as 325° to 350° F. Then a timer is set to apply heat to the oven at a later time. The thermostat functions to maintain the temperature at the preset temperature for a preset baking interval at the expiration of which the thermostat is driven by a motor to a lower setting, for example 140° F., where this temperature is held until the thermostat is manually returned to the off position.

The present invention is capable of automatically controlling the number of cooking or baking hours required as well as the temperature at which these operations are performed. The system then operates at the beginning of the preset cooking or baking time to advance the thermostat from its off or initial position to the cooking or baking position at which heat is supplied and the temperature of the oven is maintained at 325° F. or some other preadjusted temperature. At the termination of the preset cooking or baking interval, which is specified by the preset stop time, the thermostat is retracted to a holding temperature which may be 140° F. This temperature is maintained for a predetermined period, for example two hours, at the termination of which the thermostat is restored to the initial or off position, no additional heat is supplied to the oven, and the timer is returned to the manual position. The system then can be used for manual control or for automatic control as may be desired.

Among the objects of this invention are: To provide for controlling automatically the position of the thermostat setting member as above outlined; to operate the thermostat setting member from one position to another position by a thermostat electric motor which is energized by operation of a time controlled switch mechanism and deenergized by a switch mechanism controlled by the thermostat electric motor; to arrange and construct the control system for moving the thermostat setting member: (a) from an off or initial position, in which no heat is supplied to the oven, to an operating position, in which a cooking or baking temperature is maintained by the thermostat, (b) from the operating position, after a presettable time, to a holding position in which heat is supplied sufficient only to keep the oven warm, and (c) from the holding position back to the off position at the end of a predetermined time; to provide for both advancing and retracting the thermostat setting member by the motor that operates only in one driection; to advance and then retract the thermostat setting member by a gear sector that is operated by a drive member located between the teeth of the gear sector and its axis of rotation; to arrange for the drive member to engage the gear sector at a position relatively remote from its axis of rotation for rotating it in one direction and then at a position relatively near its axis of rotation for rotating it in the opposite direction; to bias the gear sector by a spring such that the spring has energy stored therein when the gear sector is rotated in the one direction and the energy is released when the gear sector is rotated in the opposite direction to assist in such rotation; to provide for moving the gear sector out of driving engagement with the drive member to permit manual positioning of the thermostat setting member to a temperature other than the preset temperature to which it otherwise would be operated by the drive member; and to provide a convenience outlet under the control of the timing mechanism and to disconnect the thermostat setting mechanism from automatic operation when the appliance is plugged into the outlet.

In the drawings:

FIGS. 20, 21, 22, 23 and 24 show the circuit connections employed for the range timer and thermostat, the several figures showing different positions of certain of the control elements.

Figures 1, 2:
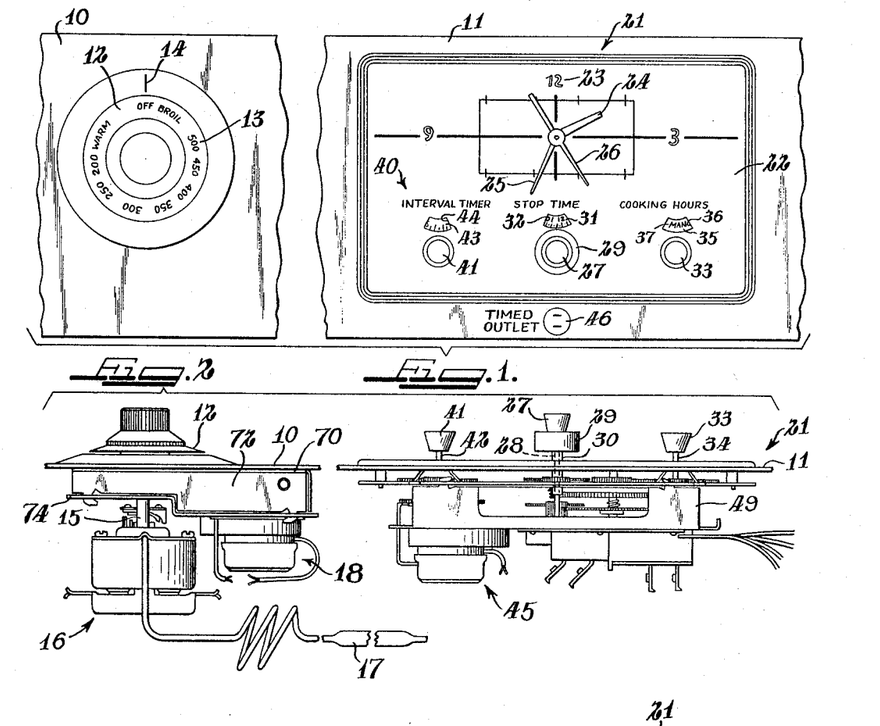
FIG. 1 is a view, in front elevation, of panel sections of a stove or oven on which the control devices of the present invention can be mounted, it being understood that there is no mechanical linkage between the control devices.
FIG. 2 is a bottom plan view of the mechanisms shown in FIG. 1.
Figure 3:
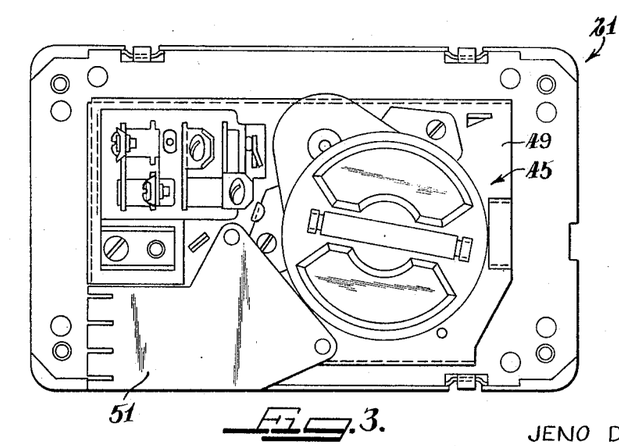
FIG. 3 is a view in rear elevation of the range timer shown in FIG. 1 and is constructed generally as shown in U.S. Patent No. 3,098,131, issued July 16, 1963, in the names of W. P. Gallagher and R. J. Dykinga and assigned to the assignee of this application.
Figure 4:
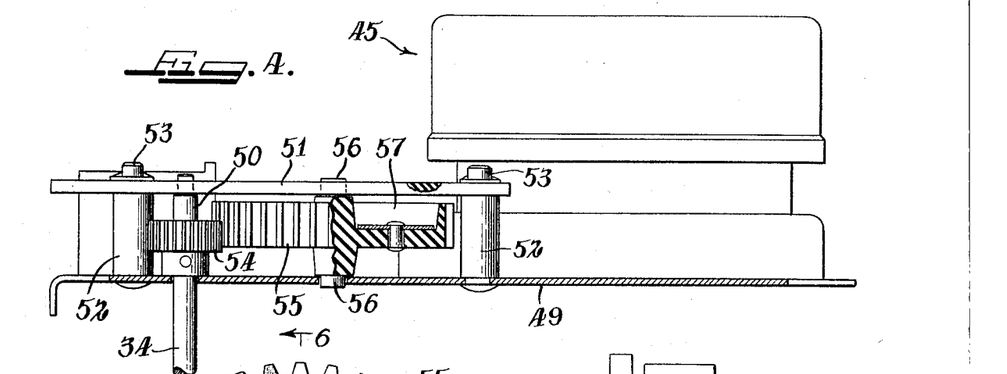
FIG. 4 is a view, partly in bottom plan and partly in section and rotated 180°, showing how the range timer of the patent above referred to is modified for receiving a part of the electrical control system for the thermostat setting member.
Figure 5:
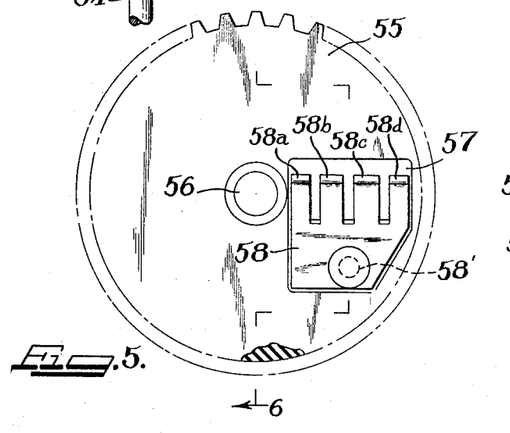
FIG. 5 is a top plan view of the gear which carries the contact strip that engages the printed circuit on the printed circuit on the printed circuit board shown in FIG. 4.
Figure 6:
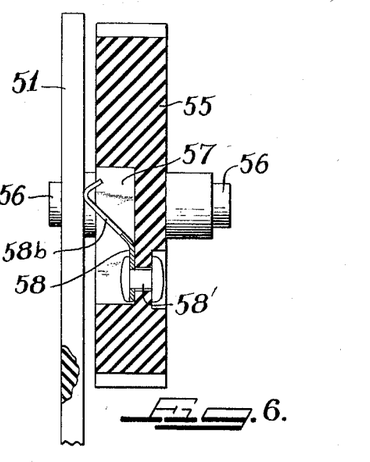
FIG. 6 is a sectional view taken generally along the line 6—6 of FIG. 5.
Figure 7:
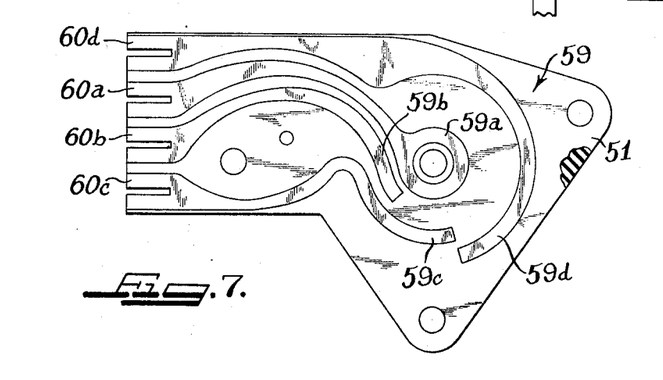
FIG. 7 is a plan view of the printed circuit board shown in FIG. 4.
Figure 11:
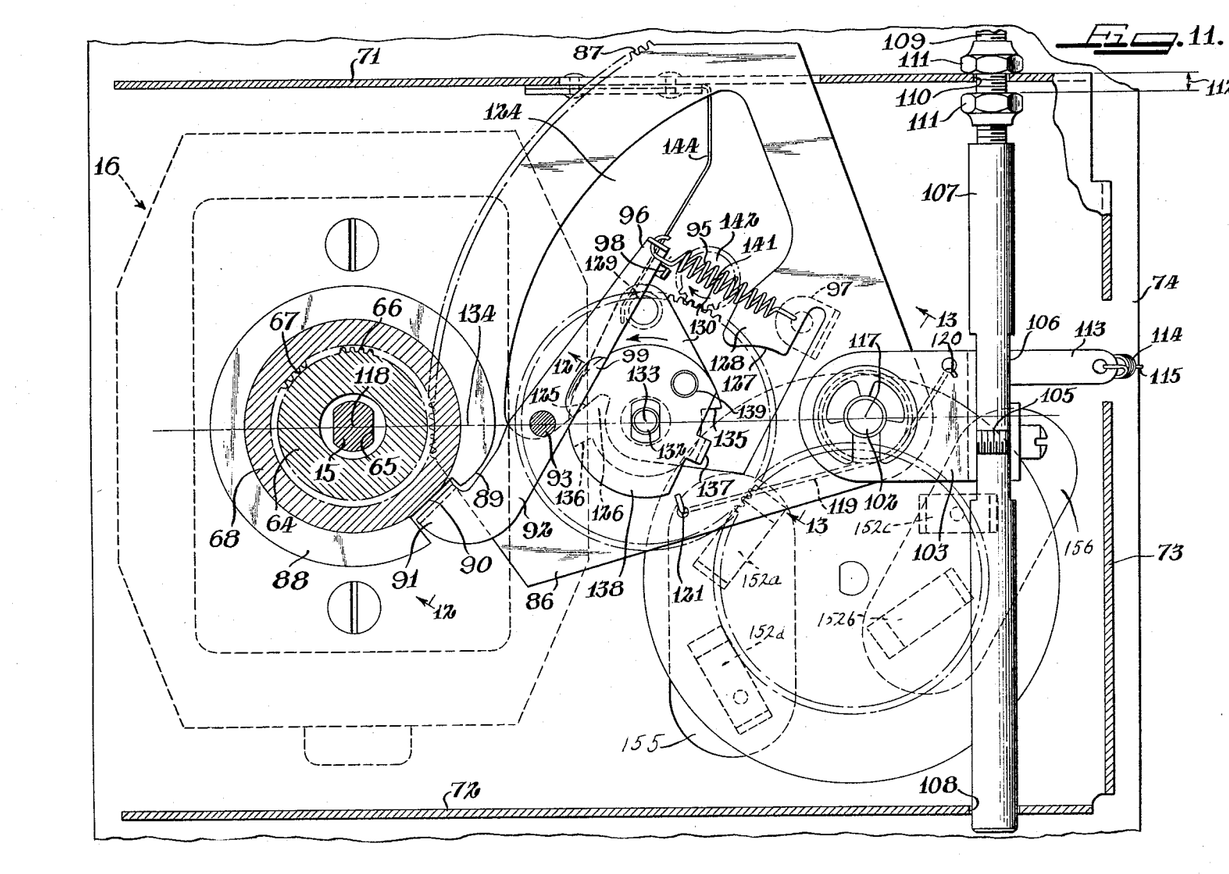
FIG. 11 is a vertical sectional view taken generally along the line 11—11 of FIG. 9 and shows the relative location of the parts making up the control mechanism when the thermostat setting member is in the off or initial position.

Referring now particularly to FIGS. 1, 2 and 3 of the drawings, it will be observed that the reference characters 10 and 11 designate panel sections of a stove or oven. It will be understood that the panel sections 10 and 11 may be contiguous or that they may be separated, depending upon the position of the oven relative to the remaining part of the stove. A thermostat dial 12 of conventional construction is mounted on the panel section 10 and it is provided with scale markings 13 that are movable with respect to a stationary index 14. The thermostat dial 12 is coupled to and rotates with a thermostat setting member 15 which, as shown in FIG. 11, has a noncircular cross section. The thermostat setting member 15 is arranged to control the setting of a thermostat, indicated generally at 16, which can be employed for controlling the supply of electric heat or gas heat to an oven in which a temperature probe 17 is located for controlling the operation of the thermostat 16. The thermostat dial 12 can be rotated manually from the off or initial position in which it is shown in FIG. 1 to any position corresponding to the desired temperature indicated by the scale marking 13 or it can be moved to the broil position. The thermostat 16, as shown in the drawings, is arranged for controlling an oven that is electrically heated. It is of conventional construction and it will be understood that a thermostat adapted for controlling the flow of gas to heat an oven can be employed, if desired. While the present invention has to do particularly with automatically positioning the thermostat setting member 15 and thereby the thermostat dial 12, it will be understood that the latter can be operated manually, if desired. For automatic operation of the thermostat setting member 15 a thermostat electric motor, shown generally at 18, is provided. The motor 18 may be constructed as shown in U.S. Patent No. 2,793,307, issued May 21, 1957, to W. P. Gallagher and assigned to the assignee of this application.

Mounted on panel section 11 is a range timer that is indicated, generally, at 21 and is constructed generally as shown in U.S. Patent No. 3,098,131, issued July 16, 1963, to W. P. Gallagher et al. The range timer 21 includes a dial plate 22 which is provided with hour numerals 23 with respect to which an hour hand 24, a minute hand 25 and a sweep second hand 26 rotate. A clock setting knob 27, mounted on a shaft 28, is provided for setting the hour hand 24 and minute hand 25 to the correct time. Behind the clock setting knob 27 is a stop time setting knob 29 that is secured to a sleeve 30 through which the shaft 28 extends. The stop time setting knob 29 is arranged to operate a stop time dial 31 which carries one to twelve hour markings along its periphery that are visible through a sight window 32. Located to the right of the clock setting knob 27 is a cooking hours setting knob 33 that is mounted on a cooking hours shaft 34 and is arranged to operate a cooking hours dial 35 which is visible through a sight window 36. The cooking hours dial 35 has a manual setting indicated at 37 and along its periphery has an indication of cooking hours one to six and an interval corresponding to two hours "warm." The mechanism embodied in the construction of the range timer 21 is described in detail in the Gallagher et al. Patent No. 3,098,131, above referred to, and will not be further described herein other than as may be necessary for an understanding of the present invention.

The range timer 21 also includes an interval timer, indicated generally at 40, that is employed for indicating the termination of a presettable interval usually less than sixty minutes. The interval timer 40 includes an interval time setting knob 41 that is mounted on a shaft 42 for controlling the position of an interval time dial 43 that is visible through a sight window 44.

The range timer 21 is operated by a timer motor 45 which may be constructed generally as shown in U.S. Patent No. 2,681,444, issued June 15, 1954, to W. P. Gallagher and assigned to the assignee of this application.

Suitably mounted on one of the panel sections 10 or 11, for example on the panel section 11, and below the range timer 21 is a timed convenience outlet 46. The outlet 46 is arranged to receive a conventional plug for energizing an appliance, such as a coffee maker. Provision is made in accordance with this invention as set forth hereinafter for effecting the energization of the outlet 46 at a predetermined time and for a predetermined interval in order to initiate the energization of the appliance at a time, for example 7 a.m.

Referring now particularly to FIGS. 4, 5, 6 and 7 of the drawings, it will be observed that the range timer 21 is provided with a rear frame plate 49 on which the timer motor 45 is mounted. It will be noted that the cooking hours shaft 34 is extended through the rear frame plate 49 and has the extension 50 thereof journaled in a printed circuit board 51 that is formed of suitable insulating material and is mounted on spacers 52 forwardly from the rear frame plate 49 with support pins 53 extending therethrough. Secured to the extension 50 of the cooking hours shaft 34 is a pinion 54 that meshes with a gear 55 that is formed of insulating material and has integral hubs 56—56 that are journaled in the rear frame plate 49 and the printed circuit board 51 respectively. A recess 57 is formed in the gear 55 for receiving a contact strip 58 which has contact fingers 58a, 58b, 58c and 58d extending therefrom toward and into contact engagement with printed circuits, shown generally at 59, that are formed on the inner side of the printed circuit board 51 as seen more clearly in FIG. 7. A rivet 58' that extends through the bottom of the recess 57 serves to hold the contact strip 58 in place. The printed circuits 59 include arcuate sections 59a, 59b, 59c and 59d that are arranged to be engaged respectively by the contact fingers 58a, 58b, 58c and 58d. Terminal sections 60a, 60b, 60c and 60d are connected respectively to the arcuate sections 59a, 59b, 59c and 59d to permit connections thereto in a manner to be described.

It will be understood that, when the cooking hours setting knob 33 is rotated to set the cooking hours dial 35 to the desired position corresponding to the number of hours required for cooking, the pinion 54 is rotated and it rotates the gear 55 to position the contact strip 58 according to the number of cooking hours that are set. The timer motor 45 is arranged to operate the range timer 21 and, as described in the Gallagher et al. Patent No. 3,098,131, above referred to, the cooking hours shaft 34 is rotated at the beginning of the cooking period. Accordingly, the contact strip 58 is rotated at a predetermined speed at the beginning of the cooking period under the control of the range timer 21. As will appear hereinafter the contact strip 58 in conjunction with the printed circuits 59 and the line contacts controlled by the range timer 21 initiate the operation of the thermostat electric motor 18. However, the thermostat electric motor 18 is deenergized under control of certain contacts to be described which are operated by the thermostat electric motor 18.

Figures 9, 10:
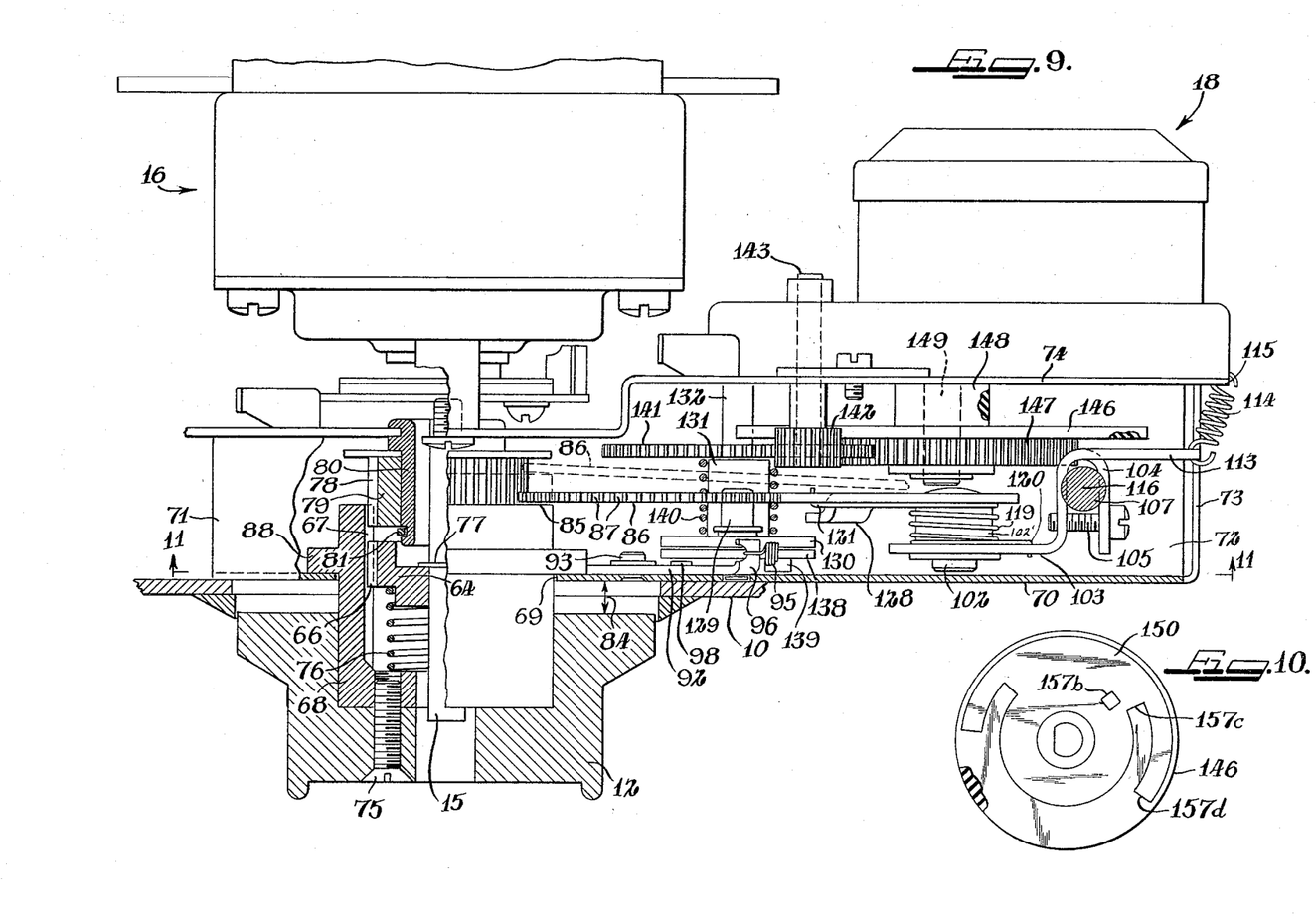
FIG. 9 is a view, partly in horizontal section and partly in plan, through the thermostat control mechanism.
FIG. 10 is a plan view of the printed circuit that is employed for controlling the stopping of the movement of the thermostat setting member, an edge view of which is shown in FIG. 9.
Figure 10:
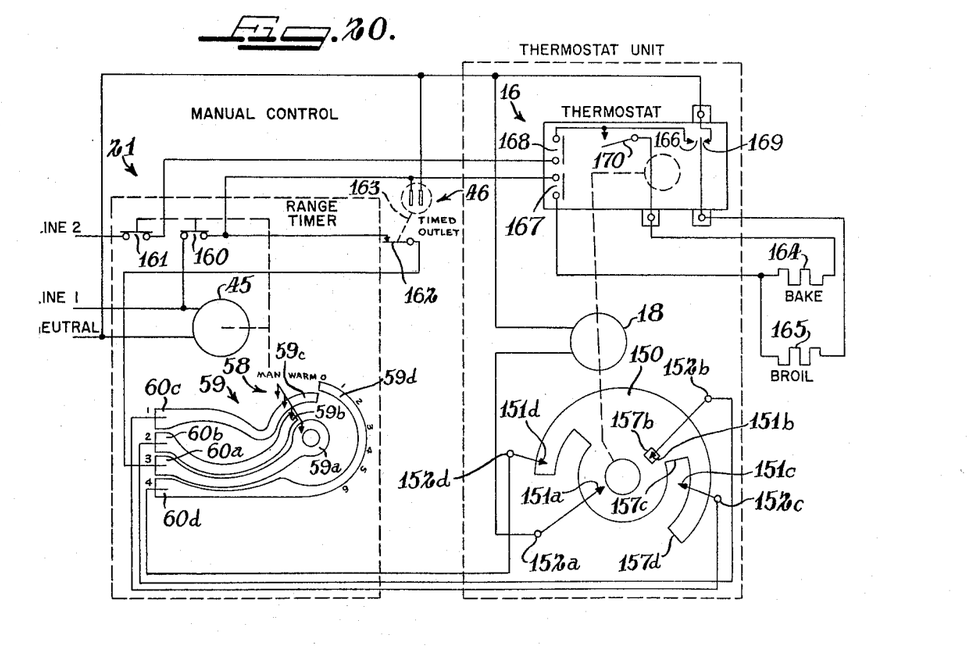

FIGS. 9 and 11 show the details of construction of the mechanism that is employed for controlling the rotation of the thermostat setting member 15 for advancing the thermostat 16 to a preadjusted position where it maintains the temperature of the oven at a corresponding temperature. At the expiration of the cooking hours, the thermostate electric motor 18 is energized to return the thermostat setting member 15 toward the initial or off position until it reaches a holding position where the thermostat 16 maintains a predetermined lower temperature for an interval, for example two hours. At the end of this interval the thermostat electric motor 18 is again energized to return the thermostat setting member 15 to the off position.

It will be understood that the thermostat 16 is of conventional construction. The thermostat setting member 15, in the form of a noncircular shaft, extends therefrom and a clutch gear 64 is provided for making mechanical connection thereto in such manner as to accommodate considerable misalignment between the thermostat setting member 15 and the thermostat dial 12. The clutch gear 64 has a noncircular opening 65 for sliding connection with the thermostat setting member 15 while permitting torque to be applied therethrough for rotating it. The clutch gear 64 has external gear teeth 66, preferably of arcuate configuration along their length, for engaging internal gear teeth 67 on a cylindrical housing 68 that projects through a clearance opening 69 in a thermostat front plate 70 that is suitably mounted on the rear side of the panel section 10. The themostat front plate 70 has rearwardly extending upper and lower sides 71 and 72 and an end 73. A stepped back plate 74 is secured to the upper and lower sides 71 and 72 and the end 73 by suitable tabs extending therefrom. The thermostat electric motor 18 is mounted on the back plate 74.

It will be observed in FIG. 9 that the thermostat dial 12 is telescoped over the forwardly projecting cylindrical housing 68 and is secured thereto by screws one of which is indicated at 75. Rotation of the thermostat dial 12 rotates the cylindrical housing 68 and therewith the clutch gear 64 to rotate the thermostat setting member 15. A coil compression spring 76 is interposed between the cylindrical housing 68 and the clutch gear 64 to hold the latter outwardly and against a retaining ring 77 carried by the thermostat setting member 15. Since the internal gear teeth 67 extend a substantial distance along the inside of the cylindrical housing 68, it is possible to move the latter rearwardly while maintaining driving engagement with the clutch gear 64. Also the internal gear teeth 67 extend sufficiently far to have driving engagement with gear teeth 78 on a thermostat pinion 79 which is rotatably mounted on a bushing 80 that is secured to and extends forwardly from the back plate 74. A retaining ring 81 at the forward end of the bushing 80 serves to hold the thermostat pinion 79 in place.

For manual setting of the thermostat dial 12 it is necessary that it be moved rearwardly a distance indicated at 84 in order to unlock a mechanism to be described. Another reason for moving the thermostat dial 12 rearwardly is to remove the thermostat 16 from automatic control insofar as the setting of the operating temperature for the oven is concerned. For this purpose the outer end of the cylindrical housing 68 provides a shoulder 85 that underlies a gear sector 86 which normally occupies the position shown by full lines but which can be moved to the position shown by broken lines when the thermostat dial 12 is moved rearwardly to substantially the distance indicated at 84. The gear sector 86 has gear teeth 87 along its periphery for driving engagement with the gear teeth 78 on the thermostat pinion 79. It will be understood that provision is made, as described hereinafter, for rotating the gear sector 86 first in one direction to advance the thermostat setting member 15 and position the thermostat 16 to maintain the desired operating temperature and later on provision is made for rotating the gear sector 86 in a reverse direction to return the thermostat setting member 15, first to a holding position and finally to the initial or off position.

Formed integrally with the cylindrical housing 68 is an annular flange 88 which, as shown in FIG. 11, has a cam surface 89 leading to a slot 90 that is arranged to receive a locking end 91 of a latch lever 92 which is provided at 93 on the thermostat front plate 70. A tongue 94, FIG. 12, extends rearwardly from the locking end 91 and is arranged to engage the forward side of the annular flange 88 for the purpose of holding the thermostat dial 12 in the position to which it has been rearwardly moved manually for the purpose of preventing its automatic positioning to the operating position while permitting manual operation to this position where it is different from the position to which the thermostat setting member 15 would be automatically positioned. A coil tension spring 95 is arranged to bias the latch lever 92 to the position shown in FIG. 11. It is anchored at one end to the other end 96 of the latch lever 92 while its other end is anchored to a tab 97 that is struck from the thermostat front plate 70. A stop tab 98, struck from the thermostat front plate 70, limits the rotation of the latch lever 92 in a clockwise direction under the influence of the spring 95. A raised section 99 on the latch lever 92 provides a part spaced rearwardly from the thermostat front plate 70 for engagement by a latch lever release pin to be described.

Figures 12, 13, 14, 15, 16, 17, 18, 19:
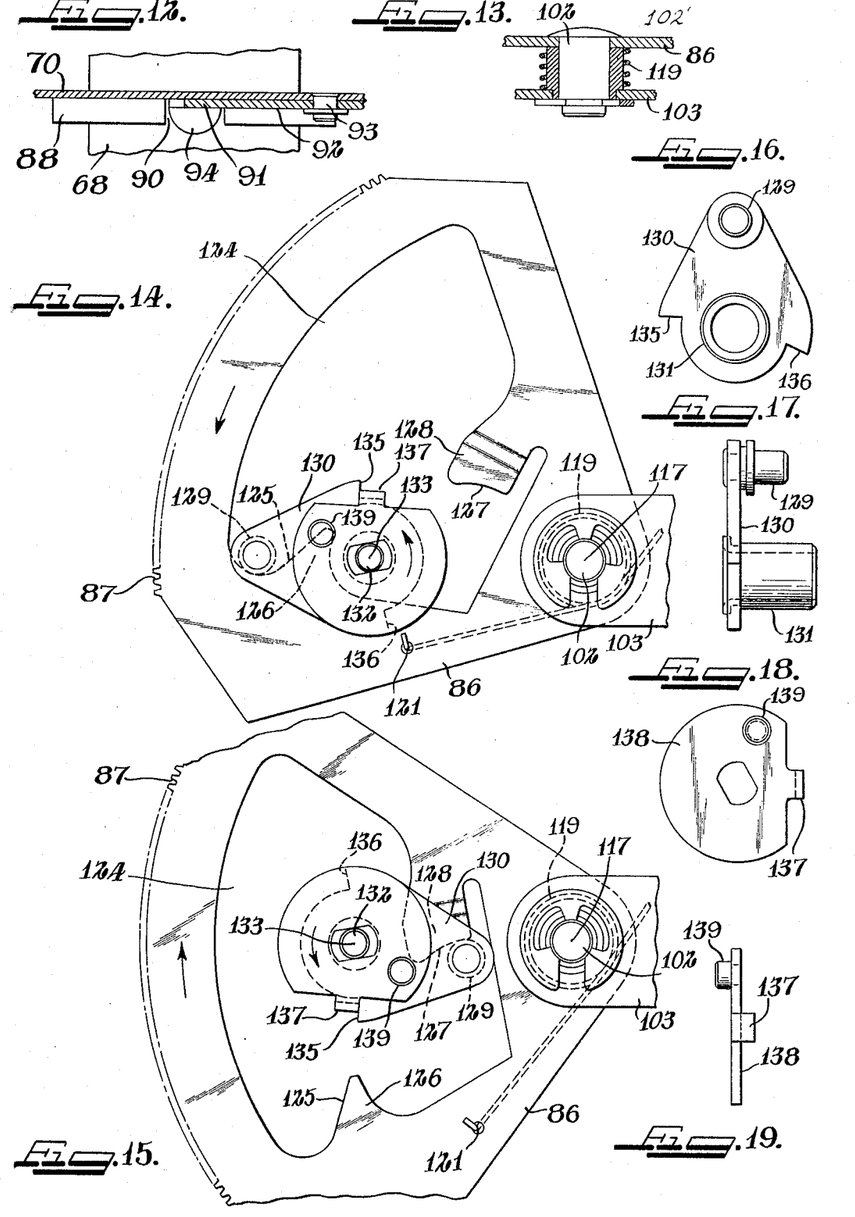
FIG. 12 is a sectional view taken generally along the line 12—12 of FIG. 11.
FIG. 13 is a sectional view taken generally along the line 13—13 of FIG. 11.
FIG. 14 is a view that shows the position of certain parts of the control mechanism at the beginning of the rotation of the sector which rotates the thermostat setting member to the operating position.
FIG. 15 is a view, similar to FIG. 14, but showing the position of certain of the parts at the time that the thermostat setting member is to be rotated from the operating position.
FIG. 16 is an elevation of the drive sector plate.
FIG. 17 is a view, in side elevation, of the drive sector plate shown in FIG. 16.
FIG. 18 is an elevation of the drive segment plate.
FIG. 19 is a view, in side elevation, of the drive segment plate shown in FIG. 18.

As shown in FIGS. 9, 11 and 13 the gear sector 86 is secured to a pin 102 that extends through a bushing 102' which forms a part of sector bracket 103. The sector bracket 103 has a bight portion 104 which is secured by a clamp screw 105 to opposite sides of a flat intermediate section 106 of a shaft 107 that has limited endwise sliding movement in an aperture 108 that is located in the lower side 72 of the thermostat front plate 70 while its other threaded end 109 extends through an aperture 110 in the upper side 71. Nuts 111—111 on the threaded end 109 of the shaft 107 and spaced apart as indicated at 112 permit limited endwise movement of the shaft 107 for the purpose of accommodating some bodily movement of the pin 102 on which the sector 86 is rotatably mounted. An arm 113 extends from the sector bracket 103 through a suitable slot in the end 73 of the thermostat front plate 70 and its distal end is connected to one end of a coil tension spring 114 the other end of which is anchored at 115 on the back plate 70. The spring 114 acts to bias the gear sector 86 about the longitudinal axis 116 of the shaft 107 and to hold it in engagement with the shoulder 85 on the cylindrical housing 68. It will be observed that the axis of rotation indicated at 116 for the shaft 107 extends transversely to the axis 117 of the pin 102 which is the axis of rotation of the gear sector 86 with respect to the sector bracket 103. Also it will be observed that the axis 117 of rotation of the gear sector 86 with respect to the sector bracket 103 is generally parallel to axis 118 of rotation of the thermostat setting member 15.

It is desirable that the gear sector 86 be biased in a direction to assist movement thereof for returning the thermostat setting number 15 from the operating position to the holding position and thereafter to the initial or off position. For this purpose a torsion spring 119 is located around the bushing 102'. One end 120 is anchored to the sector bracket 103 while the other end 121 is anchored to the gear sector 86.

As illustrated more clearly in FIGS. 14 and 15 the gear sector 86 is provided with an irregularly shaped opening 124 which includes an outer cam surface 125 on one side of a tooth shaped section 126. The outer cam surface 125 faces in a direction opposite to the direction in which an inner cam surface 127 on a stepped tongue 128 faces, the stepped tongue 128 being an integral part of the gear sector 86. The reference to outer and inner cam surfaces 125 and 127 is with reference to the axis 117 of rotation of the gear sector 86 with respect to the sector bracket 103. Since the drive for the sector bracket 103 is from a drive pin or stud 129 which rotates only in one direction, the oppositely facing cam surfaces 125 and 127 are employed for engagement by the drive pin or stud 129 which is rotatable about an axis between the axis 117 and the axis 118 of the thermostat setting member 15.

The drive pin or stud 129 is mounted on a drive sector plate 130 which is shown in detail in FIGS. 16 and 17. Here it will be observed that the drive sector plate 130 has secured thereto a sleeve 131 which forms a bearing that is journaled on a drive shaft 132, FIG. 11, the axis of rotation of which is indicated at 133. Attention is directed to the fact that the axis 133 is located along a broken line 134 that extends through the axis 117 of rotation of the gear sector 86 on the sector bracket 103 and the axis 118 of rotation of the thermostat setting member 15. Also the line 134 extends through the axis of rotation of the latch lever 92 on the pivot 93.

The drive sector plate 130 is provided with radially extending drive and stop shoulders 135 and 136 that are spaced apart a substantial angular distance. The shoulders 135 and 136 are located on opposite sides of a detent 137 which extends from a drive segment plate 138 the details of which are shown more clearly in FIGS. 18 and 19. The drive segment plate 138 is mounted on the drive shaft 132 for rotation therewith. It carries a latch lever release pin 139 that is arranged to engage the raised section 99 on the latch lever 92 for swinging the locking end 91 thereof out of locking engagement with the slot 90 in the annular flange 88 to permit automatic positioning of the thermostat setting member to the preadjusted operating position corresponding to a cooking or baking temperature on thermostat 16. The drive sector plate 130 is rotatable relative to the drive segment plate 138 as limited by the shoulders 135 and 136 and the detent 137. The drive sector plate 130 is biased in a clockwise direction as viewed in FIG. 11 relative to the drive segment plate 138 by a torsion spring 140 which is positioned, as seen in FIG. 9, around the sleeve 131. One end of the torsion spring 140 is anchored to the drive pin or stud 129 while the other end is anchored to a drive gear 141 that is fast on the drive shaft 132. The thermostat electric motor 18 is arranged to drive the drive gear 141 through a pinion 142 which is mounted on an output shaft 143 from the gear train (not shown) interposed between it and the motor 18.

In the off position of the thermostat 16 and parts associated therewith as seen in FIG 11, the drive sector plate 130 is held in the position there shown against the biasing action of the torsion spring 140 by a drive pin stop spring 144 that is anchored to the underside of the upper side 71 of the thermostat front plate 70. The lower end of the spring 144, which is a leaf spring, bears against one side of the drive pin or stud 129 and holds it and the drive sector plate 130 in the position shown. However, on rotation of the drive segment plate 138 in a counterclockwise direction, the detent 137 engages the drive shoulder 135 and continued rotation overcomes the action of the spring 144. The drive pin or stud 129 then is released and, under the influence of the spring 140, it is rotated to the position shown in FIG. 14 to operate in a manner to be described for rotating the gear sector 86 in a counterclockwise direction to operate the thermostat setting member 15 to the operating position.

As pointed out hereinbefore provision is made for deenergizing the thermostat electric motor 18 under the control of contact means operated thereby. For this purpose a printed circuit board 146 is employed and is mounted for rotation with a gear 147 that meshes with and is driven by the drive gear 141. The printed circuit board 146, formed of suitable insulating material, and the gear 147 are rotatably mounted on a plastic bushing 148 which is mounted on a pin 149 that extends forwardly from the back plate 74.

Figure 8:
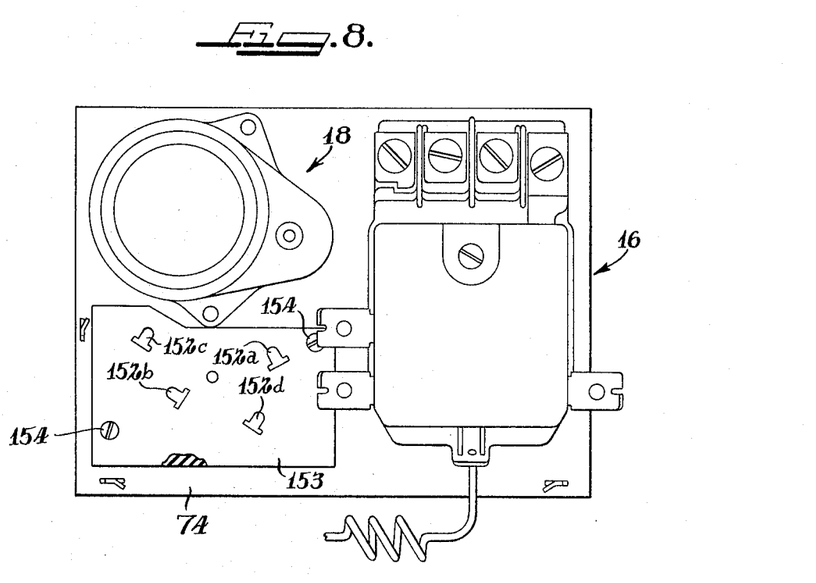
FIG. 8 is a view, in rear elevation, of the thermostat and associated control mechanism.

FIG. 10 shows the printed circuit board 146 as provided with a printed circuit 150. The printed circuit 150 faces the inner or forward side of the back plate 74 and is arranged to be engaged by contacts 151a, 151b, 151c and 151d, FIG. 20, having terminals 152a, 152b, 152c and 152d connected thereto. As seen in FIG. 8 these terminals are mounted on a terminal board 153 that is secured by screws 154—154 to the rear side of the back plate 74 which has slots 155 and 156, FIG. 11, through which the contacts 151a–b–c–d project for engagement with the printed circuit board 146 and the printed circuit 150 thereon depending upon the position of the latter.

The function of the printed circuit 150 is to effect deenergization of the thermostat electric motor 18. Accordingly, the arrangement is such that edges 157b, 157c and 157d are provided on the printed circuit 150 where the contacts 151b, 151c and 151d disengage, depending upon the position of the printed circuit board 146 and the printed circuit 150 thereon, to effect the deenergization of the thermostat electric motor 18.

Referring now particularly to FIG. 20, it will be observed that the range timer 21 includes normally closed timer line contacts 160 and 161 that are connected, respectively, to line 1 and line 2 which may be connected to a suitable source of alternating current such as a 60 cycle source. Line 1 and line 2 may comprise a part of a three wire circuit having a voltage of 230 volts therebetween with a neutral connection therebetween as indicated and in accordance with conventional practice. Associated with the contacts 160 is a single pole single throw switch 162 that is arranged to be opened through a mechanical connection indicated by broken line 163 when a plug is inserted in the timed outlet 46. It will be noted that the opening of the switch 162 opens the energizing circuit to the terminal 60a of the printed circuits 59 and thus removes the thermostat 16 from automatic control while permitting the appliance that is plugged into the outlet 46 to be energized at a predetermined time that is set on the range timer 21.

The oven with which the thermostat 16 is associated is provided with a conventional bake heating element 164 and a broil heating element 165. When contacts 166 of a single pole double throw switch are closed, the broil heating element 165 is connected for energization directly between line 1 and line 2 when the thermostat dial 12 is set to the broil position in which thermostat controlled contacts 167 and 168 are closed. It will be understood that these contacts 167 and 168 are opened and closed by the thermostat 116 in conventional manner for maintaining a temperature in the oven depending upon the setting of the thermostat dial 12. This action takes place when the other contacts 169 of the single pole double throw switch are closed and contacts 170 of a single pole single throw switch 170 are closed. In the particular circuit arrangement shown, when the operating temperature is to be maintained, the bake heating element 164 is connected for energization between lines 1 and 2 while the broil heating element 165 is connected for energization between line 1 and neutral.

The control system embodying the present invention is arranged to function under four different sets of operating conditions. The one selected depends upon the wishes of the operator. The first is manual operation in which the range timer 21 is not adjusted and its contacts 160 and 161 remain closed. The thermostat dial 12 is set either to the broil position or to an operating position to maintain a temperature selected along the scale 13 for a time as may be desired for manual control. The second operating condition involves a semiautomatic operation. For it the thermostat dial 12 is moved rearwardly to disengage the latch lever 92 and then is set to the desired temperature above 140° F. at which it is desired to operate. Thereafter the range timer 21 is set to initiate the cooking or baking operation at the desired time and for the desired interval after which the thermostat setting member 15 and the thermostat dial 12 thereon are retracted to the holding or warming position at which a temperature of 140° F. is maintained. At the end of the two hour period the thermostat setting member 15 and the thermostat dial 12 are returned to the off or initial position.

The third operation involves a complete automatic control of the thermostat setting member 15. The range timer 21 is set for the desired stop time with the cooking hours required. Then the system functions at the proper time to advance the thermostat setting member 15 and the thermostat dial 12 from the off or initial position to a preadjusted position, for example 325° F., which is maintained for the preset cooking hours. At the terminal of this interval the thermostat setting member 15 and the thermostat dial 12 are returned to the holding or warm position and maintained there for two hours after which they are returned to the off position and the cooking hours dial 37 of timer 21 is also returned to the manual position. The fourth operating condition involves the use of the timed outlet 46. As a result of the insertion of a plug in the timed outlet 46, the switch 162 is opened in order to prevent any operation of the thermostat 16. The range timer 21 then is adjusted in accordance with the time at which it is desired that the appliance plugged into the timed outlet 46 shall be energized. These several different operating conditions will be described in detail.

*Manual operation*

Often it is desired to control the operation of the oven entirely manually and for a short period. It may be necessary to utilize the oven at a high temperature for a short interval to perform certain cooking or baking operations that cannot readily be controlled by the range timer 21. At other times it may be desirable to use the oven for warming purposes for a short interval. For such operation no setting on the range timer 21 is made. Accordingly, the timer line contacts 160 and 161 remain closed, FIG. 20. The thermostat dial 12 is moved rearwardly as permitted by its mounting through a distance substantially as indicated at 84 in FIG. 9. Then it is rotated to the desired temperature as appears on the scale 13. When the thermostat dial 12 is rotated after it has been moved rearwardly, it is held in this position against the biasing action of the spring 76 by the tongue 94 on the locking end 91 of the latch lever 92 which reacts against the forward side of the annular flange 88 on the cylindrical housing 68. Rotation of the thermostat dial 12, as described, is accompanied by rotation of the gear sector 86. Since the thermostat electric motor 18 is not energized under the assumed conditions, the gear sector 86, while moved to the position shown by broken lines in FIG. 9, does not effect any control function. When the cooking or baking operation has been completed, the thermostat dial 12 is manually rotated to the initial or off position. This returns the slot 90 to registry with the locking end 91 of the latch lever 92 which permits the spring 76 to return the cylindrical housing 68 and the thermostat dial 12 to the outermost position.

*Semi-automatic operation*

For this operation it is assumed that the temperature to be maintained by the oven is different from the preadjusted temperature of 325° F. to which the thermostat 16 is automatically operated. For example it may be desirable that the oven be maintained at a temperature of 400° F. for the preset cooking period. Therefore, the thermostat dial 12 is moved rearwardly to clear the locking end 91 of the latch lever 92 and then it is rotated to the desired position, for example to a position in which the desired temperature marking registers with the index 14. The thermostat dial 12 then is held in this rearward position by the tongue 94 on the locking end 91 of the latch lever 92 until it is returned to the initial or off position by the subsequent automatic operation under the control of the range timer 21. Next the range timer 21 is preset. It will be assumed that the cooking or baking operation is to be completed at 6 p.m. and that two hours are required for accomplishing it. Accordingly, the stop time setting knob 29 is adjusted to position the stop time dial 31 at the 6 o'clock position. The cooking hour setting knob 33 is adjusted to position the cooking hours dial 35 at the two hour position. It is assumed that the timer motor 45 has been in operation and that the time indicated by the hour hand 24 and minute hand 25 is the correct time.

When the thermostat dial 12 was moved inwardly and rotated, such movement was accompanied by movement of the gear sector 86 to the alternate position shown by broken lines. While the gear teeth 87 of the gear sector 86 remain in driving engagement with the gear teeth 78, on the thermostat pinion 79, and it is rotated about its axis 117, such movement is sufficient to clear the drive pin or stud 129.

When the stop time was set by adjustment of the stop time setting knob 29, timer line contacts 160 and 161 were opened. They remain open until the cooking operation is to be initiated which is two hours before the stop time of 6 o'clock or at 4 o'clock. At this time the range timer 21 functions to close timer line contacts 160 and 161. Since the thermostat dial 12 had previously been set to a predetermined temperature, thermostat contacts 167 and 168 already were closed so that the heating elements 164 and 165 are connected for energization in the manner previously described.

At the same time thermostat electric motor 18 is energized. This is accomplished on closure of timer line contacts 160. The energizing circuit can be traced in FIG. 21 from line 1 through contacts 160, the contacts of switch 162, the terminal 60a contact strip 58 which was set to the two hour position on setting of the cooking hour setting knob 33 as will be apparent from FIG. 21. The circuit extends from the arcuate section 59a of the printed circuit through the contact strip 58 to the arcuate section 59d and thence through terminal 60d through a conductor to terminal 152d and contact 151d which is connected by printed circuit 150 to contact 151a to which terminal 152a is connected. The circuit is completed for energizing the thermostat electric motor 18 from the terminal 152a through the motor 18 and thence to the neutral conductor of the three wire supply circuit.

Upon energization of the thermostat electric motor 18, the motor pinion 142 is rotated to drive the drive gear 141 which rotates drive shaft 132 and therewith the drive segment plate 138. The latter is rotated from the position shown in FIG. 11 to move the detent 137 into engagement with drive shoulder 135 on the drive sector plate 130. As the drive continues the drive pin or stud 129 moves past the drive pin stop spring 144 and is released so that the spring 140 swings the drive sector plate 130 to the position shown in FIG. 14 where the drive pin or stud 129 normally would engage outer cam surface 125 on the tooth shaped section 126 of the gear sector 86. However, since, under the assumed conditions, the gear sector 86 has been shifted to the position shown by broken lines in FIG. 9, the drive pin or stud 129 does not engage the outer cam surface 125 but continues to rotate until it reaches the inner cam surface 127 of gear sector 86 at the particular position occupied thereby at this time.

At the same time that the drive gear 141 is being rotated, the gear 147 is rotated together with the printed circuit board 146. The rotation continues until the printed circuit 150 has been rotated to the position shown in FIG. 22 where edge 157d has moved out of engagement with contact 151d. This opens the previously traced energizing circuit for the thermostat electric motor 18 and it is deenergized. The thermostat contacts 167 and 168 are controlled by the thermostat 16 in conventional manner to maintain the temperature of the oven at the temperature that has been manually preset by the thermostat dial 12.

It will be observed that, while the circuit for energizing the thermostat electric motor 18 was completed on closure of timer line contacts 160 through the contact strip 58, the circuit is opened under the control of the thermostat electric motor 18 when the edge 157d of the printed circuit 150 disengages the contact 151d. One reason for employing this arrangement is that the contact strip 58 and the contact fingers thereof move relatively slowly. Accordingly, it is not feasible to utilize this movement for opening the energizing circuit to the thermostat electric motor 18.

Figure 21:
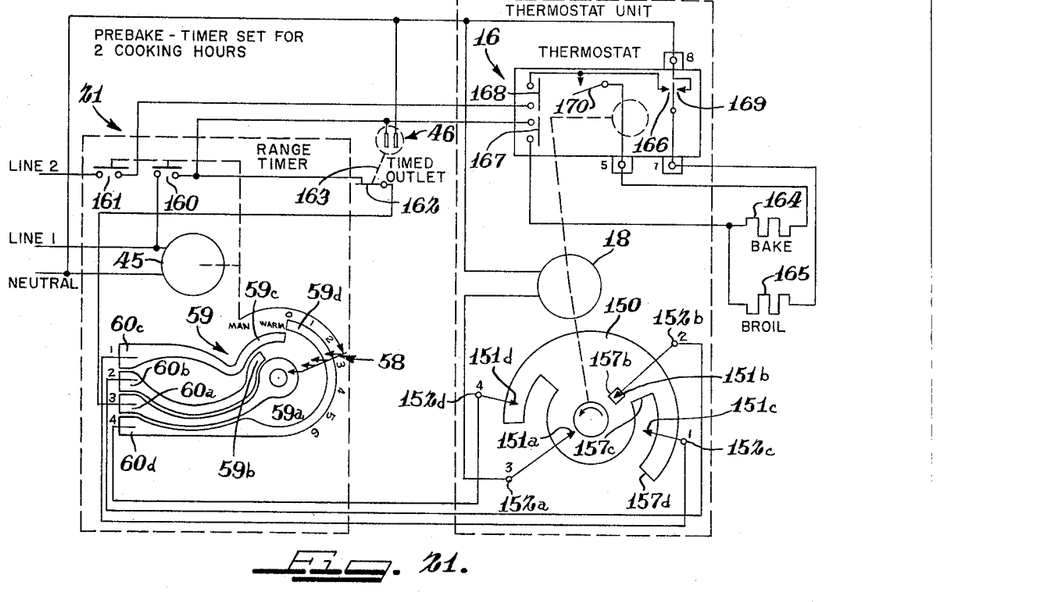
Figure 22:
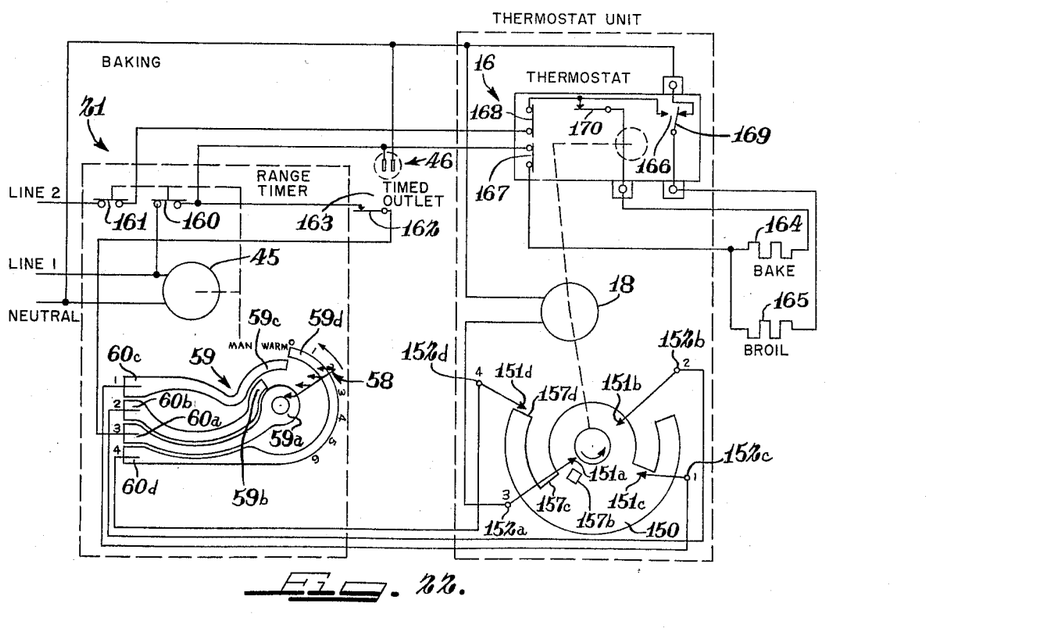

During the two hour preset cooking or baking period that has been assumed, the timer motor 45 continues to move the contact strip 58 from the two hour position, indicated in FIG. 21, toward the zero position, indicated in FIG. 22. At the end of this period contact finger 58d moves out of engagement with the arcuate section 59d and at the same time contact finger 58c moves into engagement with section 59c of the printed circuits 59. The thermostat electric motor 18 is again energized over a circuit that can be traced from line 1 through timer line contact 160, switch 162, terminal 60a arcuate section 59a, contact strip 58, arcuate section 59c terminal 60c to terminal 52c and contact 151c which, as shown in FIG. 22, is in engagement with the printed circuit 150. Accordingly, it completes a circuit through contact 151a and terminal 152a to the thermostat electric motor 18 and thence to the neutral conductor of the supply circuit.

As a result of this energization of the thermostat electric motor 18 the drive gear 141 is rotated together with the drive segment plate 138. The detent 137 engages the drive shoulder 135 and the operation continues with the drive sector plate 130 being rotated to the position shown in FIG. 15 where the drive pin or stud 129 engages the inner cam surface 127. Continued rotation of the drive sector plate 30 causes the gear sector 86 to be rotated in a clockwise direction which is assisted by energy previously stored in the torsion spring 119 when the thermostat dial 12 was moved in the manner previously described to the preadjusted temperature. It will be observed that the inner cam surface 127 is relatively close to the axis 117 of rotation of the gear sector 86 and thus the drive pin or stud 129 acts at a lesser mechanical advantage than it does when, under fully automatic operating conditions, it engages the outer cam surface 125 to rotate the gear sector 86 and move the thermostat setting member 15 together with the thermostat dial 12 to the preset position.

Figure 23:
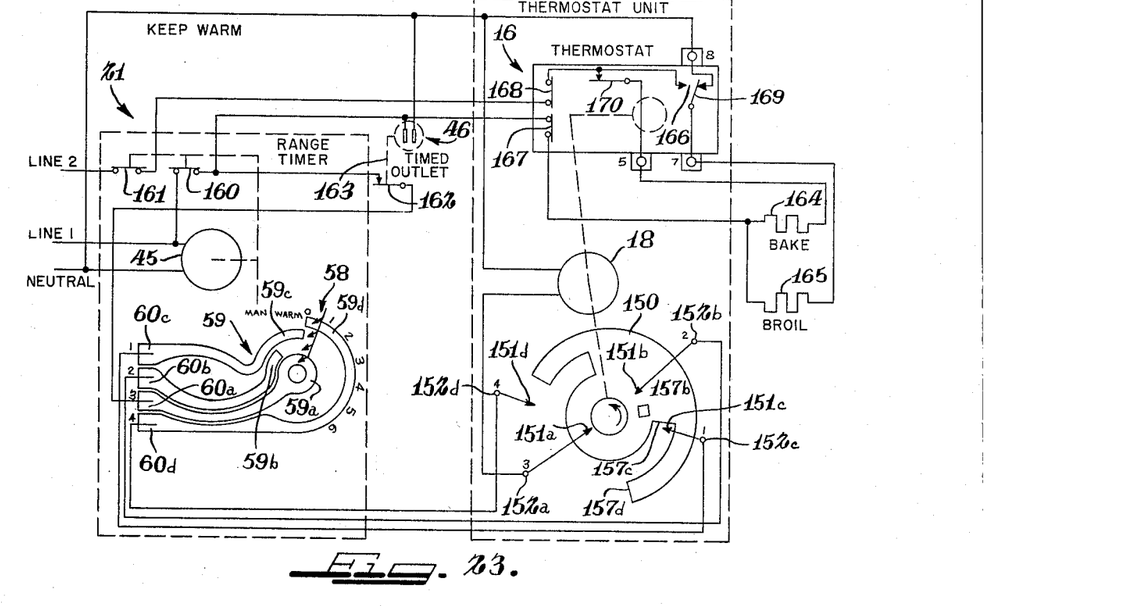

The energization of the thermostat electric motor 18 continues and the gear sector 86 rotates the thermostat setting member 15 toward the holding or warm position of 140° F. Meanwhile the gear 147 is being rotated by the drive gear 141 and the printed circuit board 146 is being rotated until the position shown in FIG. 23 is reached where the edge 157c of the printed circuit 150 has moved out of engagement with the contact 151c. The previously traced energizing circuit for the thermostat electric motor 18 then is opened and it is deenergized.

During the holding or keep warm period of two hours, the contact strip 58 continues to be moved by the timer motor 45. At the end of the holding or keep warm period of two hours contact finger 58b engages arcuate section 59b of the printed circuits 59. A circuit then is completed for again energizing the thermostat electric motor 18. That circuit can be traced from line 1, through timer line contacts 160, switch 162, terminal 60a, arcuate section 59a, contact strip 58, arcuate section 59b, terminal 60b to terminal 152b and contact 151b which, as shown in FIG. 23, is in engagement with the printed circuit 150. The circuit continues through the printed circuit 150 to contact 151a, terminal 152a and through the thermostat electric motor 18 to the neutral conductor of the supply circuit. The thermostat electric motor 18 then is energized and continues to drive the drive sector plate 130 in the manner previously described with the drive pin or stud 129 against the inner cam surface 127. The gear sector 86 is rotated with the assistance of the torsion spring 119 and thereby the thermostat setting member 15 and the thermostat dial 12 are rotated to the initial or off position. This occurs at the same time that the printed circuit 150 is rotated to the position shown in FIG. 24 where the edge 157b has moved out of engagement with contact 151b. Accordingly, the previously traced energizing circuit for the thermostat electric motor 18 is opened and it is deenergized. In this position of the thermostat 16 the thermostat controlled contacts 167 and 168 are opened, the contacts 169 of the single pole double throw switch are opened and the contacts of the single pole single throw switch 170 are opened. Essentially the system is returned to the circuit connections and switch and contact arrangements as shown in FIG. 20 with the timer line contacts 160 and 161 closed.

When the thermostat setting member 15 and the thermostat dial 12 have been returned to the initial or off position, the slot 90 in the annular flange 88 again registers with the locking end 91 of the latch lever 92 and the spring 76 moves the thermostat dial 12 to the outermost position.

*Automatic operation*

This sequence of operations is similar to the sequence of operations previously described for the semi-automatic operation except that the thermostat electric motor 18 is permitted to rotate the thermostat setting member 15 and the thermostat dial 12 to the preset position which may be 325° F.

Under these assumed conditions it is only necessary to adjust the range timer 21 in the manner previously described. Again it will be assumed that the stop time is to be 6 p.m. and that the cooking hours are two hours. Accordingly, the stop time setting knob 29 and the cooking hours setting knob 33 are adjusted as previously described. As a result the timer line contacts 160 and 161 are opened as indicated in FIG. 21 and the contact strip 58 with its contact fingers is moved to the position here shown corresponding to two cooking hours.

As previously described the thermostat electric motor 18 is energized to drive the drive gear 141 and therewith the drive segment plate 138 from the position shown in FIG. 11. The detent 137 engages the drive shoulder 135 and moves the drive sector plate 130 in a counterclockwise direction with the drive pin or stud 129 moving out of engagement with the drive pin stop spring 144. Upon release from the spring 144, the spring 140 urges the drive sector plate 130 to the position shown in FIG. 14 where the drive pin or stud 129 engages the outer cam surface 125. During this operation the latch lever release pin 139 engages the raised section 99 on the latch lever 92 and moves the locking end 91 out of the slot 90 and to a position where the cam surface 89 can engage the adjacent side of the tongue 94 when the continued rotation of the gear sector 86 as driven by the drive pin or stud 129 rotates the thermostat setting member 15 and the thermostat dial 12 forwardly toward the preset temperature of 325° F. Attention is directed to the fact that the latch lever 92 is rotated in a similar fashion during the semiautomatic operation above described. However, because of the width of the annular flange 88, even though the latch lever 92 is rotated in the manner described here, it is not rotated far enough to cause the tongue 94 to clear the annular flange 88. Thus, for the semiautomatic operation, the thermostat dial 12 is maintained in the rearward or innermost position throughout the entire semiautomatic operation. The thermostat electric motor 18 continues to rotate the gear sector 86 in a manner described and at the same time energy is stored in the torsion spring 119.

The forward movement of the gear sector 86 continues until the thermostat electric motor has rotated the printed circuit 150 to the position shown in FIG. 22 where the energizing circuit for the thermostat electric motor 18 is opened by disengagement of the edge 157d from the contact 151d.

Thereafter the automatic operation is the same as described for the semiautomatic operation and will not be repeated.

*Automatic control of timed outlet*

It will be assumed that an appliance is to be energized at 7 a.m. Accordingly, it is plugged into the convenience outlet 46. When this occurs the single pole single throw switch 162 is opened by the connection indicated at 163. As previously pointed out this opens the energizing circuit to the thermostate electric motor 18.

Figure 24:
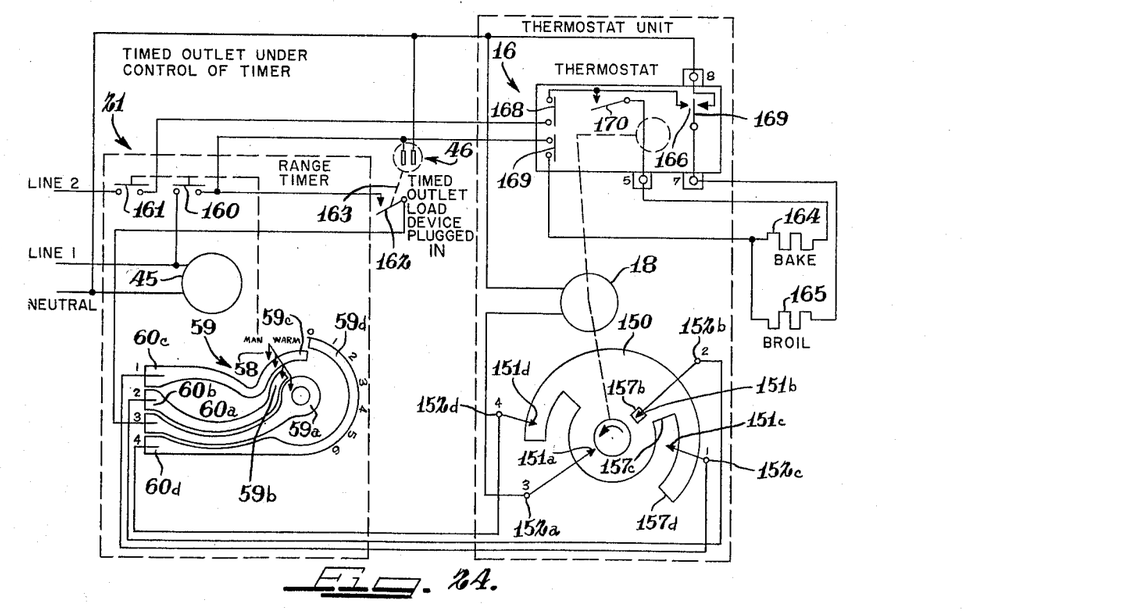

In order to have the outlet 46 energized at 7 o'clock it is necessary to make special adjustment of the range timer 21. The cooking hour setting knob 33 is rotated to position the cooking hours dial 35 at one hour and the stop time setting knob 29 is rotated to set the stop time dial 31 for 8 o'clock. When these operations have been completed the timer line contacts 160 and 161 are opened as indicated in FIG. 24. The timer motor 45 continues to run and at 7 o'clock the line contacts 160 and 161 are closed. The outlet 46 then is connected for energization between the neutral conductor and line 1. The range timer 21 continues to operate and the timer contacts 160 remain closed. The outlet 46 is primarily designed for use by appliances having their own thermostat control, such as an automatic coffee maker.

What is claimed as new is:

1. In a system for controlling the temperature of an oven, in combination:
   (a) a thermostat adapted to be responsive to the temperature of the oven and arranged to control the heat supplied thereto for maintaining said temperature,
   (b) a thermostat setting member including a gear member rotatable therewith from an initial position in which no heat is supplied to the oven to another position in which heat is supplied to the oven to maintain a corresponding temperature,
   (c) a reversible rotatable gear sector for driving said gear member to rotate said thermostat setting member,
   (d) a unidirectional drive motor, and
   (e) means for operatively interconnecting said motor and said gear sector for rotating said gear sector in one direction to rotate said thermostat setting member from said initial position to said other position and for rotating said gear sector in the opposite direction to rotate said thermostat setting member back toward said initial position.

2. The invention, as set forth in claim 1, wherein a spring biases the gear sector against rotation in the one direction and assists rotation thereof in the opposite direction.

3. In a system for controlling the temperature of an oven, in combination:
   (a) a thermostat adapted to be responsive to the temperature of the oven and arranged to control the heat supplied thereto for maintaining said temperature,
   (b) a thermostat setting member including a gear member rotatable therewith from an initial position in which no heat is supplied to the oven to another position in which heat is supplied to the oven to maintain a correspondng temperature,
   (c) a rotatable gear sector for driving said gear member to rotate said thermostat setting member, said gear sector having outer and inner oppositely facing cam surfaces at greater and lesser distances respectively from its axis of rotation,
   (d) a drive motor, and
   (e) means for operatively interconnecting said motor and said gear sector including a drive member driven by said motor in one direction for engaging said outer cam surface to advance said thermostat setting member from said initial position and for engaging said inner cam surface to retract said thermostat setting member toward said initial position.

4. The invention, as set forth in claim 3, wherein a spring reacts against the gear sector, is additionally tensioned when said gear sector is rotated to advance the thermostat setting member, and delivers energy stored therein when said gear sector is rotated to retract said thermostat setting member.

5. The invention, as set forth in claim 3, wherein means are provided for causing relative movement between the outer cam surface and the drive member sufficient to prevent the latter from engaging the former on energization of the motor whereby the thermostat setting member can be advanced manually while operative relationship is maintained between the inner cam surface and said drive member.

6. The invention, as set forth in claim 5, wherein means are provided for manually shifting the gear sector to position the outer cam surface out of the path of the drive member.

7. The invention, as set forth in claim 6, wherein the gear sector is mounted for rotation on a shaft that is rotatable about an axis transverse to the axis of rotation of said gear sector.

8. The invention, as set forth in claim 7, wherein the shaft has a limited freedom of movement along the axis of rotation.

9. The invention, as set forth in claim 6, wherein latch means cooperate with the gear sector to hold it in the manually shifted position.

10. The invention, as set forth in claim 9, wherein:
    (a) the latch means is a latch lever that holds the thermostat setting member against rotation in its initial position and is moved to unlatching position when the drive member approaches the outer cam surface,
    (b) said thermostat setting member has an axially movable part that cooperates with the gear sector to move it to the manually shifted position; and
    (c) means on said part of said thermostat setting member cooperates with said latch lever and holds the former in the manually shifted position until said thermostat setting member is retracted to the initial position.

11. The invention, as set forth in claim 3, wherein the drive member is mounted for rotation about an axis that is generally parallel to the axis of rotation of the thermostat setting member and the gear sector and is located therebetween and generally along a line joining said axes.

12. The invention, as set forth in claim 3, wherein timing means control the energization of the motor for retracting the thermostat setting member to a position where the temperature of the oven is maintained at a holding temperature for a predetermined time after the expiration of which said motor is energized for retracting said thermostat setting member to the initial position.

13. The invention, as set forth in claim 1, wherein:
    (a) the drive motor is a thermostat electric motor and rotates the thermostat setting member to the other position in which a baking temperature in the oven is maintained and after a predetermined interval said thermostat electric motor rotates said thermostat setting member toward said initial position, and
    (b) timing means are connected to said thermostat electric motor to energize it sequentially for moving said thermostat setting member as aforesaid.

14. The invention, as set forth in claim 13, wherein:
(a) means operated by the thermostat electric motor effects deenergization thereof after the thermostat setting member has been retracted to a holding position in which heat is supplied to the oven to maintain a holding temperature that is less than the baking temperature, and
(b) means operated by the timing means effect energization of said thermostat electric motor after a predetermined time to rotate said thermostat setting member to the initial position.

References Cited by the Examiner
UNITED STATES PATENTS

| | | | |
|---|---|---|---|
| 2,529,913 | 11/1950 | Candor | 219—493 X |
| 2,545,846 | 3/1951 | Dunn | 236—46 |
| 2,801,799 | 8/1957 | McColloch | 236—46 |
| 3,043,517 | 7/1962 | Hanna | 236—46 |
| 3,123,298 | 3/1964 | Wolffe | 236—46 |
| 3,167,248 | 1/1965 | Douglas | 236—46 X |

ALDEN D. STEWART, *Primary Examiner.*